(12) United States Patent
Hoshuyama

(10) Patent No.: US 7,982,782 B2
(45) Date of Patent: Jul. 19, 2011

(54) SIGNAL PROCESSING DEVICE, SIGNAL PROCESSING PROGRAM AND ELECTRONIC CAMERA

(75) Inventor: Hideo Hoshuyama, Takatsu-ku (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/702,949

(22) Filed: Feb. 9, 2010

(65) Prior Publication Data

US 2010/0158370 A1 Jun. 24, 2010

Related U.S. Application Data

(62) Division of application No. 10/876,638, filed on Jun. 28, 2004, now abandoned.

(30) Foreign Application Priority Data

Jul. 1, 2003 (JP) .................................. 2003-189520

(51) Int. Cl.
*H04N 5/228* (2006.01)
(52) U.S. Cl. .................................... 348/222.1; 348/252
(58) Field of Classification Search ............... 348/222.1, 348/272, 280, 252, 649–652
See application file for complete search history.

(56) References Cited

U.S. PATENT DOCUMENTS

| 5,357,353 A | 10/1994 | Hirota |
| 5,539,523 A | 7/1996 | Nakai et al. |
| 5,585,860 A | 12/1996 | Takeshima |
| 5,712,680 A * | 1/1998 | Hieda ........................ 348/220.1 |
| 6,229,580 B1 | 5/2001 | Inoue |
| 6,510,242 B1 | 1/2003 | Westerman |
| 6,853,400 B1 * | 2/2005 | Matama .......................... 348/96 |
| 7,154,545 B2 * | 12/2006 | Gann et al. .................... 348/271 |
| 7,251,056 B2 | 7/2007 | Matsushima |
| 2002/0027670 A1 | 3/2002 | Takahashi et al. |
| 2003/0020974 A1 | 1/2003 | Matsushima |
| 2003/0034986 A1 | 2/2003 | Fukasawa |

FOREIGN PATENT DOCUMENTS

| EP | 0 604 758 A1 | 7/1994 |
| JP | A-4-342366 | 11/1992 |
| JP | A-05-037776 | 2/1993 |
| JP | A-05-300367 | 11/1993 |
| JP | A-06-006587 | 1/1994 |
| JP | A-09-050531 | 2/1997 |
| JP | A-2001-109889 | 4/2001 |
| JP | A-2002-281327 | 9/2002 |
| JP | A-2003-85545 | 3/2003 |

* cited by examiner

*Primary Examiner* — Tuan Ho
(74) *Attorney, Agent, or Firm* — Oliff & Berridge, PLC

(57) ABSTRACT

The present invention includes a color converting section carrying out color conversion processing and a coefficient correcting section setting a correcting coefficient group to a coefficient group of the color conversion. The coefficient correcting section sets a local area containing a pixel to be processed, and calculates "feature information of the local area" containing at least one of averaged color information, averaged luminance information, and flatness on the basis of the pixel signals of the local area. The coefficient correcting section determines a correcting coefficient group to be used for the pixel to be processed on the basis of the feature information of the local area. With this construction, the present invention suppresses influence of noise when changing the color conversion processing for each pixel.

3 Claims, 5 Drawing Sheets

FIG. 3

[FIG. 3A]
LOCAL AREA
CONTAINING
Gb AT CENTER

|   | 0 | 1 | 2 | 3 | 4 | 5 | 6 |
|---|---|---|---|---|---|---|---|
|   | R | G | R | G | R | G | R |
| 0 | G | B | G | B | G | B | G |
| 1 | R | G | R | G | R | G | R |
| 2 | G | B | G | B | G | B | G |
| 3 | R | G | R | G | R | G | R |
| 4 | G | B | G | B | G | B | G |
|   | R | G | R | G | R | G | R |

[FIG. 3B]
LOCAL AREA
CONTAINING
Gr AT CENTER

|   | 0 | 1 | 2 | 3 | 4 | 5 | 6 |
|---|---|---|---|---|---|---|---|
|   | B | G | B | G | B | G | B |
| 0 | G | R | G | R | G | R | G |
| 1 | B | G | B | G | B | G | B |
| 2 | G | R | G | R | G | R | G |
| 3 | B | G | B | G | B | G | B |
| 4 | G | R | G | R | G | R | G |
|   | B | G | B | G | B | G | B |

[FIG. 3C]
LOCAL AREA
CONTAINING
B AT CENTER

|   | 0 | 1 | 2 | 3 | 4 | 5 | 6 |
|---|---|---|---|---|---|---|---|
|   | G | R | G | R | G | R | G |
| 0 | B | G | B | G | B | G | B |
| 1 | G | R | G | R | G | R | G |
| 2 | B | G | B | G | B | G | B |
| 3 | G | R | G | R | G | R | G |
| 4 | B | G | B | G | B | G | B |
|   | G | R | G | R | G | R | G |

[FIG. 3D]
LOCAL AREA
CONTAINING
R AT CENTER

|   | 0 | 1 | 2 | 3 | 4 | 5 | 6 |
|---|---|---|---|---|---|---|---|
|   | G | B | G | B | G | B | G |
| 0 | R | G | R | G | R | G | R |
| 1 | G | B | G | B | G | B | G |
| 2 | R | G | R | G | R | G | R |
| 3 | G | B | G | B | G | B | G |
| 4 | R | G | R | G | R | G | R |
|   | G | B | G | B | G | B | G |

SIGNAL PROCESSING DEVICE, SIGNAL PROCESSING PROGRAM AND ELECTRONIC CAMERA

CROSS REFERENCE TO RELATED APPLICATION

This is a Divisional of U.S. patent application Ser. No. 10/876,638 filed on Jun. 28, 2004 now abandoned, which is hereby incorporated by reference in its entirety. This application is based upon and claims the benefit of priority from Japanese Patent Application No. 2003-189520, filed on Jul. 1, 2003, the entire contents of which are incorporated herein by reference.

BACKGROUND OF THE INVENTION

1. Field of the Invention

The present invention relates to a color conversion processing technique applied to color image equipment such as an electronic camera, a video camera, a scanner, a printer or the like.

2. Description of the Related Art

In general, color image equipment includes a color conversion circuit for carrying out color conversion processing (which may contain conversion of a color system or the like) in conformity with an input/output characteristic inherent to the color image equipment in order to provide an image signal with excellent color reproducibility.

The color conversion circuit is mainly classified into a look-up table circuit which is frequently used for a scanner, a printer or the like, and a matrix circuit which is frequently used for an electronic camera, a video camera or the like.

Of these circuits, the look-up table circuit stores pixel signals (R', G', B') achieved after pixel signals (R, G, B) of each color are subjected to color conversion, and thus it can perform not only linear (first order) color conversion, but also higher-order color conversion. In such color conversion, complicated color conversion characteristics can be set in conformity with input/output characteristics of image equipment.

Therefore, according to the look-up table circuit, high color reproducibility can be provided to pixel signals, and all pictures of respective colors can be reproduced with proper colors. However, it has a drawback in that the amount of information to be stored is large, resulting in increase in circuit scale.

On the other hand, the matrix circuit can perform only linear color conversion because it merely stores a common conversion expression (normally, linear transformation matrix of 3×3) to pixel signals (R, G, B) of each color.

Therefore, it is impossible for the matrix circuit to provide high reproducibility to pixel signals, and pictures of all colors cannot be necessarily reproduced with proper colors. However, it has an advantage that the amount of information to be stored is small and an operation is simple, so that the circuit scale thereof can be suppressed to a small one.

With respect to the matrix circuit, it may be expected that the order of the color conversion be increased so that a color conversion characteristic is set like a curved line. In this case, however, for example when the order of the color conversion is incremented by 1 so that the curved line is set to a second-order curved line, the transformation matrix is scaled up to 3×9, and also it is required to generate vectors ($R^2$, $G^2$, $B^2$, RG, GB, BR, R, G, B) adaptive to the transformation matrix. Therefore, the frequency of multiplication and division required for the whole color conversion is remarkably increased to +24, for example. Accordingly, in order to set the color conversion characteristic to a high-order curved line like a third-order or fourth-order curved line, it is needless to say that the circuit scale is remarkably increased.

Therefore, as in the case of the matrix circuit disclosed in Japanese Unexamined Patent Application Publication No. Hei 6-6587 or Japanese Unexamined Patent Application Publication No. Hei 5-300367, it has been attempted that plural kinds of coefficient groups of the transformation matrix are prepared in advance while the conversion order is kept to 1, and also these coefficient groups are selectively used in accordance with a color range to which a pixel signal belongs, whereby the color conversion characteristic can be approached to a proper curved line without increasing the circuit scale greatly.

The inventor of this application has found a problem that color conversion processing is sensitively varied by noise contained in a pixel signal and thus the color conversion processing is carried out so that the noise is conspicuous in the above-described related art.

Furthermore, since the color conversion characteristic is varied every pixel in the above-described related art, many places at which the color conversion characteristic is greatly varied occur on a screen. Therefore, there has been also concerned a problem that steps in the color conversion characteristic cause false signals (noise) and thus they are conspicuous.

SUMMARY OF THE INVENTION

Therefore, an object of the present invention is to provide a technique of suppressing the noise as described above even when color conversion processing is adjusted for every pixel.

The present invention will be described hereunder.

A signal processing device according to the present invention includes a color converting section multiplying an input color pixel signal by a transformation matrix to execute color conversion processing, and a coefficient correcting section setting a correcting coefficient group to a coefficient group of the transformation matrix.

Particularly, the coefficient correcting section has an analyzing section, a correspondence setting section, and a coefficient determining section described below.

First, the analyzing section sets a local area so that the local area contains a pixel to be processed, and calculates average color information (hereinafter referred to as "averaged color information") from plural pixel signals of the local area. In this case, the averaging calculation processing preferably contains an operation of calculating an average value, a weighted average value, a median, a mode, an average value excluding the maximum and minimum values, etc.

A correspondence relation between the "averaged color information" and the "correcting coefficient group" is preset in the correspondence setting section.

The coefficient determining section collates the averaged color information calculated in the analyzing section with the correspondence relation, and determines a correcting coefficient group to be used for a pixel to be processed.

The main feature of the above construction resides in that the color conversion processing (that is, the correcting coefficient group) is adjusted not by using color information of a pixel to be processed, but by using averaged color information of the local area.

Normally, even when a pixel to be processed contains a lot of noise, averaged color information that is an average value of a local area is less subject to influence of the noise. Therefore, such a problem in the related art that the color conversion processing is sensitively varied by noises of pixel signals and thus the noises are multiplicatively conspicuous can be properly solved.

Furthermore, with respect to adjacent pixels, most of local areas set for the respective pixels are overlapped with each other. Therefore, the averaged color information is not greatly varied between the adjacent pixels. Accordingly, great variation of the color conversion processing hardly occurs between adjacent pixels, and the phenomenon that a step of a color conversion characteristic induces a false signal (noise) and thus becomes conspicuous can be overcome.

Still furthermore, in a local area, various color information is contained in a detail portion of an image (such as a minute pattern of hair) or in the neighborhood of an edge. Therefore, averaged color information in that local area does not so much reflect various color information one by one and thus it becomes neutral color information. As a result, an operation of rapidly varying the color conversion processing for the detail portion of the image hardly occurs, and thus minute and complicated color variation of the detail portion can be left accurately.

More preferably, the coefficient correcting section adjusts the correcting coefficient group so that saturation of an average hue of a local area containing a pixel to be processed is selectively enhanced.

In the above construction, the color conversion processing is carried out on the pixel to be processed so that the saturation of the averaged hue of the local area is enhanced.

Accordingly, at a place where a local area has a substantially uniform hue, the uniform hue appears strongly and clearly by the average color information. As a result, the hue of a pixel to be processed is converted so that the color thereof is vivid. For example, a subject having a substantially uniform hue such as a large flower or a signboard which are artificially painted with respective colors is reproduced more vividly.

On the other hand, at a place where various hues are contained in a local area, the various hues are smoothed through an averaging process. Therefore, there is no risk that the hue is emphasized every minute pixel, and thus there can be prevented the trouble that color noise appearing every pixel when an image is displayed while being enlarged is made conspicuous by an emphasis action of the saturation, or the like.

Another signal processing device of the present invention includes a color converting section multiplying an input color pixel signal by a transformation matrix to execute color conversion processing, and a coefficient correcting section setting a correcting coefficient group to a coefficient group of the transformation matrix.

Particularly, the coefficient correcting section has an analyzing section, a correspondence setting section, and a coefficient determining section described below.

First, the analyzing section sets a local area containing a pixel to be processed, and calculating average luminance information (hereinafter referred to as "averaged luminance information") from plural pixel signals of the local area. For example, the averaging operation processing described above preferably contains an operation of calculating an average value, a weighted average value, a median, a mode, an average value excluding the maximum and minimum values, etc.

A correspondence relation between the "averaged luminance information" and the "correcting coefficient group" is preset in the correspondence setting section.

The coefficient determining section collates the correspondence relation on the basis of the averaged luminance information calculated in the analyzing section, and determines the correcting coefficient group to be used for the pixel to be processed.

The main feature of the above construction resides in that the color conversion processing (that is, the correcting coefficient group) is adjusted not by using luminance information of a pixel to be processed, but by using averaged luminance information of the local area.

Normally, even when a pixel to be processed contains a lot of noise, the averaged luminance information that is an average value of the local area is less subject to influence of the noise. Therefore, such a problem of the related art that the color conversion processing is sensitively varied by noises of pixel signals and thus the noises are multiplicatively conspicuous can be properly solved.

Furthermore, with respect to adjacent pixels, most of local areas set for the respective pixels are overlapped with each other. Therefore, the averaged luminance information is not greatly varied between the adjacent pixels. Accordingly, great variation of the color conversion processing hardly occurs between adjacent pixels, and the phenomenon that a step of a color conversion characteristic induces a false signal (noise) and thus becomes conspicuous can be overcome.

Still furthermore, in a local area, luminance information having a large difference in contrast is contained in a detail portion of an image (such as a minute pattern of hair) or in the neighborhood of an edge. Therefore, averaged luminance information in that local area does not reflect luminance information having a large difference in contrast one by one and thus it becomes neutral luminance information. As a result, an operation of varying the color conversion processing for each pixel in the detail portion of the image hardly occurs, and minute and complicated color variation of the detail portion can be left accurately.

More preferably, the coefficient correcting section adjusts the correcting coefficient group so that saturation is increased when average luminance of the local area containing the pixel to be processed is in a predetermined intermediate gradation range. In the other cases, the coefficient correcting section adjusts the correcting coefficient group so that the saturation is decreased.

In the above construction, when the luminance of the local area is substantially uniform and is in the predetermined intermediate gradation range, the saturation of the pixel to be processed is adjusted so that the color thereof is vivid. As a result, contrast of color can be emphasized on an image of low contrast in which the luminance is concentrated in intermediate gradation, and thus an excellent image having a strong impact can be obtained.

On the other hand, when the luminance of the local area is uniformly out of the intermediate gradation range (bright portion or dark portion), the saturation of the pixel to be processed is not emphasized extremely. Accordingly, such a trouble that the signal level of a pixel signal is saturated at a bright portion by saturation emphasis or color noise at a dark portion is made conspicuous by saturation emphasis, or the like, can be surely prevented.

It is assumed that there may be a case where average luminance information is judged to be in an intermediate gradation range at an edge portion or the like. In such a case, excessive saturation emphasis is applied to the edge portion, making color noise conspicuous. Therefore, in such a case, it is preferable to suppress the influence of the saturation emphasis at the edge portion by using a judgment based on flatness in combination.

Another signal processing device of the present invention includes a color converting section multiplying an input color pixel signal by a transformation matrix to execute color conversion processing, and a coefficient correcting section setting a correcting coefficient group to a coefficient group of the transformation matrix.

Particularly, the coefficient correcting section has an analyzing section, a correspondence setting section, and a coefficient determining section described below.

First, the analyzing section sets a local area containing a pixel to be processed, and determines flatness on a pixel space on the basis of plural pixel signals of the local area.

A correspondence relation between "flatness" and "correcting coefficient group" is preset in the correspondence setting section. The coefficient determining section collates the correspondence relation on the basis of the flatness calculated in the analyzing section, and determines the correcting coefficient group to be used for the pixel to be processed.

The main feature of the above construction resides in that the color conversion processing (that is, the correcting coefficient group) is adjusted not by using information of a pixel to be processed, but by using the flatness of the local area.

Normally, as the level of noise is increased, space variation of a pixel signal is randomly increased, and thus flatness is judged to be low. Accordingly, a place having a noise can be extracted to execute color conversion processing suitable for the place having the noise by setting the flatness of the local area as a scale. As a result, noise occurring when adjusting the color conversion processing for each pixel as in the case of the related art can be improved.

Furthermore, the flatness is generally judged to be low at a detail portion (minute pattern such as hair or the like) of an image or in the neighborhood of an edge because the space variation of a pixel signal is magnified there. Conversely, it is judged for a flat area of an image that the space variation of a pixel signal is smooth and the flatness is high.

Accordingly, by adjusting the color conversion characteristic with the flatness as a scale, the color conversion processing can be adjusted so that it suits each of a flat area and a non-flat area (a portion having large noise level, a detail portion, around an edge, and the like).

Therefore, a false color appearing at a color boundary can be made inconspicuous and contrast of color can be emphasized at a color boundary or edge portion of an image. Furthermore, for example, at a flat area, an impression of an overall image can be made vivid in color by saturation emphasis, or an impression of an overall image can be made sober by weakening saturation emphasis of a flat area (sky or the like) occupying a large area of an image.

More preferably, the coefficient correcting section adjusts a correcting coefficient group so that saturation is more increased, as flatness of the local area containing a pixel to be processed is higher. On the other hand, as the flatness is lower, the coefficient correcting section adjusts the correcting coefficient group so that the saturation is more decreased.

In the above construction, saturation is selectively increased for a flat area and decreased for a non-flat area (detail portion, edge portion or the like). As a result, the flat area can be made vivid in color to make an impression of an overall image colorful, and a false color (for example, chromatic aberration of magnification) can be made inconspicuous in the non-flat area.

Another signal processing device according to the present invention includes a color converting section multiplying an input color pixel signal by a transformation matrix to execute color conversion processing, and a coefficient correcting section setting a correcting coefficient group to a coefficient group of the transformation matrix.

Particularly, the coefficient correcting section has an analyzing section, an aberration judging section and a coefficient determining section described below.

First, the analyzing section sets a local area containing a pixel to be processed, and calculates averaged color information and flatness on the basis of plural pixel signals of the local area.

The aberration judging section judges whether all the following conditions (1) and (2) are satisfied.

(1) The averaged color information is in a hue range of any one of green and magenta.

(2) The flatness is lower than a predetermined threshold value and indicates a color boundary or edge portion.

When both the conditions (1) and (2) are satisfied in the aberration judging section, the coefficient determining section determines a correcting coefficient group that lowers saturation for a coefficient group to be used for a pixel to be processed.

In general, the probability that a place where both the conditions (1) and (2) are satisfied corresponds to a place where color aberration of magnification appears is high. Accordingly, the color aberration of magnification appearing in an image can be made inconspicuous by selectively lowering the saturation (including saturation emphasis) at this place.

Another signal processing device according to the present invention includes a color converting section multiplying an input color pixel signal by a transformation matrix to execute color conversion processing, and a coefficient correcting section setting a correcting coefficient group to a coefficient group of the transformation matrix.

Particularly, the coefficient correcting section has an analyzing section, a skin judging section, and a coefficient determining section described below.

First, the analyzing section sets a local area containing a pixel to be processed, and calculates averaged color information, averaged luminance information, and flatness on the basis of plural pixel signals of the local area.

A skin judging section judges whether all of the following conditions (1) to (3) are satisfied.

(1) Averaged color information is in a predetermined hue range of skin tone.

(2) Averaged luminance information is in a luminance range of skin.

(3) Flatness is flatter than flatness indicated by a predetermined threshold value and is in a flatness range of skin.

If all the conditions (1) to (3) are satisfied in the skin judging section, the coefficient determining section determines a correcting coefficient group for enhancing reproducibility of skin tone to a coefficient group to be used for a pixel to be processed.

In general, the probability that a place where all of the conditions (1) to (3) are satisfied corresponds to a skin portion of a personal subject is high. Accordingly, by selectively enhancing reproducibility of skin tone at this place, an image having high reproducibility of skin tone can be achieved with no adverse effect on the background of green or blue color.

When enhancing reproducibility of skin tone, it is preferable that saturation of a hue range of skin tone is selectively increased or the hue of skin tone is varied to a hue reflecting a complexion (i.e., color is varied to be nearer to pink, red, liver, and burned umber).

Another signal processing device of the present invention includes a color converting section multiplying an input color pixel signal by a transformation matrix to execute color conversion processing, and a coefficient correcting section setting a correcting coefficient group to a coefficient group of the transformation matrix.

Particularly, the coefficient correcting section has an analyzing section, a blue sky judging section, and a coefficient determining section described below.

First, the analyzing section sets a local area containing a pixel to be processed, and calculates averaged color information, averaged luminance information, and flatness on the basis of plural pixel signals of the local area.

A blue sky judging section judges whether all of the following conditions (1) to (3) are satisfied.

(1) Averaged color information is in a hue range of blue sky.

(2) —Averaged luminance information shows a brighter value than luminance indicated by a predetermined threshold value and is in a luminance range of blue sky.

(3) Flatness is flatter than flatness indicated by a predetermined threshold value and is in a flatness range of blue sky.

If all the conditions (1) to (3) are satisfied in the blue sky judging section, the coefficient determining section determines a correcting coefficient group for enhancing reproducibility of blue sky to a coefficient group to be used for a pixel to be processed.

In general, the probability that a place where all of the conditions (1) to (3) are satisfied corresponds to a blue sky portion is high. Accordingly, by selectively enhancing reproducibility of color of blue sky at this place, an image having high reproducibility of blue sky can be achieved with no adverse effect on green color or skin tone.

When enhancing reproducibility of color of blue sky, it is preferable that saturation of a hue range of blue sky is selectively increased or the hue of blue sky is varied to be nearer to vivid dark blue.

Another signal processing device of the present invention includes a color converting section multiplying an input color pixel signal by a transformation matrix to execute color conversion processing, and a coefficient correcting section setting a correcting coefficient group to a coefficient group of the transformation matrix.

Particularly, the coefficient correcting section has an analyzing section, a correspondence setting section, and a coefficient determining section described below.

The analyzing section sets a local area containing a pixel to be processed, and on the basis of pixel signals of the local area, calculates feature information of the local area (local feature information) which contains at least one of averaged color information, averaged luminance information, and flatness.

A correspondence between "local feature information" and "correcting coefficient group" is preset in the correspondence setting section.

The coefficient determining section collates a correspondence relation on the basis of the local feature information calculated in the analyzing section, and determines a correcting coefficient group to be used for a pixel to be processed.

A signal processing program of the present invention is characterized by making a computer function as the color converting section and the coefficient correcting section described above. The signal processing program is stored on a computer readable medium and is executed by the computer.

By using the signal processing program, a computer can function as the signal processing device of the present invention.

An electronic camera of the present invention includes a photographing section photographing a subject and generates a color pixel signal, and the signal processing device described above. The signal processing device subjects the pixel signal generated in the photographing section to the color conversion processing described above.

According to the present invention, as described above, the averaged color information, the averaged luminance information, and the flatness are determined for the local area which is set so as to contain a pixel to be processed, and a coefficient of color conversion is determined on the basis of feature information of the local area as described above.

In this case, noise of feature information is sufficiently suppressed in an averaging process in the local area. As a result, there hardly occurs execution of unexpected color conversion processing due to noise.

Furthermore, since most of local areas set in adjacent pixels are overlapped with each other, feature information calculated for each local area is not drastically varied. Accordingly, the probability that the coefficient of the color conversion is drastically varied between adjacent pixels is low. As a result, such a trouble that the coefficient of the color conversion is drastically varied between adjacent pixels to generate a lot of false color boundary or false color can be properly suppressed.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 3 is a diagram showing an example of a local area;

DETAILED DESCRIPTION OF THE PREFERRED EMBODIMENT

A preferred embodiment according to the present invention will be described hereunder in detail with reference to the accompanying drawings.

Embodiment

Description of Construction of Embodiment

Figure 1:
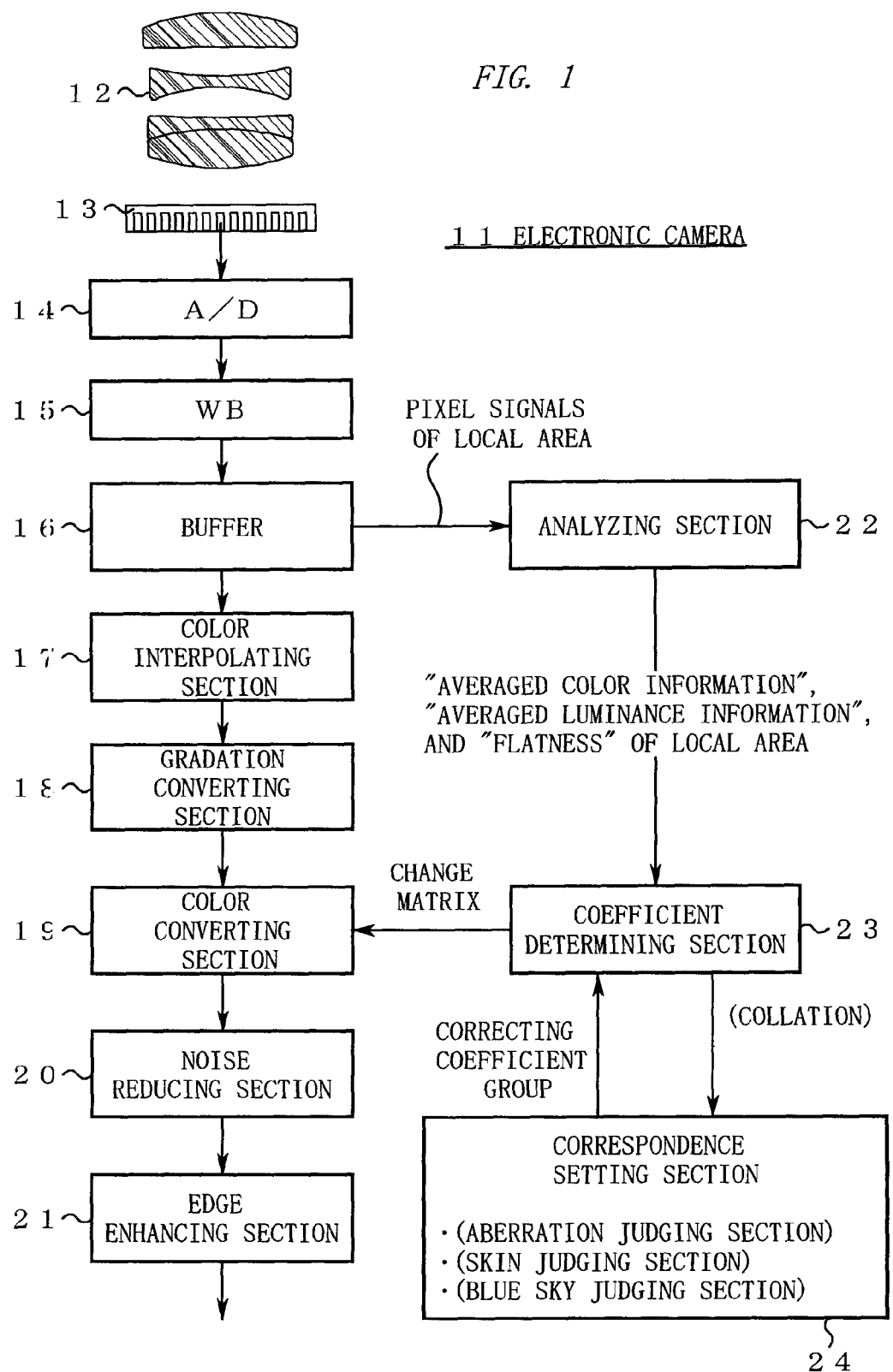
FIG. 1 is a block diagram showing an electronic camera 11 according to an embodiment.

FIG. 1 is a block diagram showing an electronic camera 11 of this embodiment.

In FIG. 1, a phototaking lens 12 is mounted in the electronic camera 11. A photographing face of an image sensor 13 is disposed in an image space of the phototaking lens 12. An image output of the image sensor 13 is subjected to predetermined processing through an analog-to-digital conversion section 14 and a white balance adjusting section 15, and then stored as image data in a buffer 16.

The image data in this buffer 16 is processed through a color interpolating section 17, a gradation converting section 18, a color converting section 19, a noise reducing section 20 and an edge enhancing section 21, and then recorded in a compressed style in a recording medium (not shown).

Furthermore, the electronic camera 11 includes an analyzing section 22, a coefficient determining section 23 and a correspondence setting section 24.

Each of the analyzing section 22 and the coefficient determining section 23 are constructed by a microprocessor or the like. The correspondence setting section 24 is constructed by a memory or the like.

An aberration judging section, a skin judging section and a blue sky judging section described in "claims" are contained in the correspondence setting section 24.

Description of Operation of Embodiment

Figure 2:
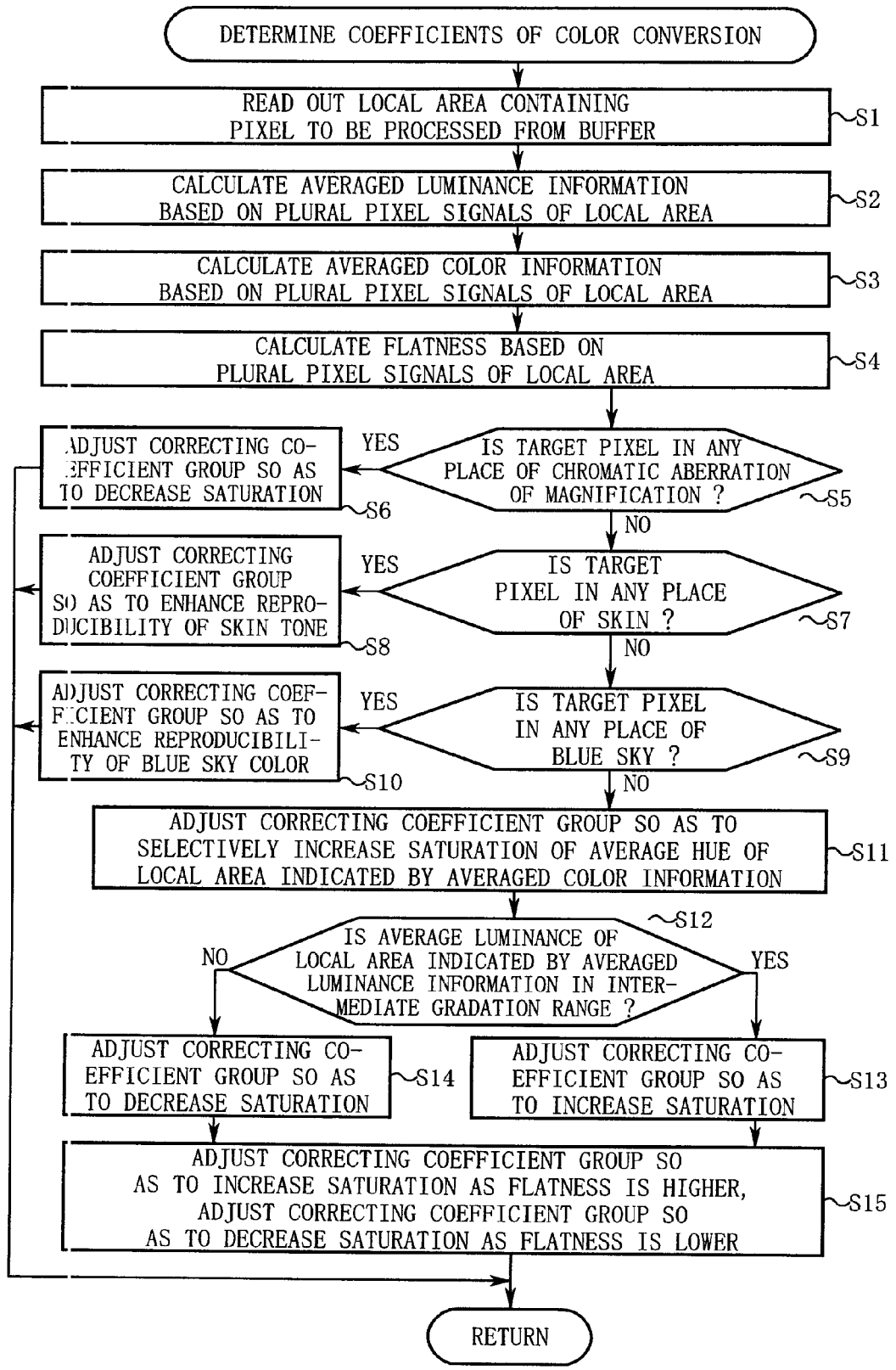
FIG. 2 is a flowchart showing an operation of determining a coefficient matrix of color conversion.

An operation of determining a correcting coefficient group of color conversion processing every pixel in the electronic camera 11 is shown in a flowchart of FIG. 2.

A characteristic operation of the present invention will be described step by step along the flowchart of FIG. 2.

Step S1: The analyzing section 22 sets a local area containing a pixel to be subjected to color conversion. The analyzing section 22 reads out plural pixel signals corresponding to the local area from the buffer 16.

FIGS. 3A to 3D are diagrams showing examples of the local area thus set. In these examples, a pixel range of 9 pixels in the horizontal direction and 7 pixels in the vertical direction is set as a local area with a pixel to be processed (a pixel indicated by a boldface) located at the center of the pixel range. With respect to the size of the local area, it is preferable to increase or reduce the size of the local area in conformity with the number of vertical and horizontal pixels of image data, output resolution, print size and display size.

When a pixel to be processed is located in the neighborhood of an edge of a screen, the range set as the local area may run off the edge of the image data.

In such a case, it is preferable that pixel fold-back is carried out with an edge of the screen as a symmetrical axis, thereby embedding a pixel-vacant portion of the local area with pixels. In this case, the pixel-vacant portion of the local area is embedded with the pixels originally-located at the area corresponding to the vacant portion which is folded back to the screen (i.e., the image data) with respect to the edge of the screen (the symmetrical axis).

Furthermore, the vacant portion of the local area may be embedded by using value of the pixel to be processed or that of adjacent pixel thereof.

Step S2: The analyzing section 22 calculates averaged luminance information on the basis of plural pixel signals contained in the local area according to the following procedure.

First, the analyzing section 22 adds the plural pixel signals of the local area every color to calculate an additional value $T\Sigma(R)$, $T\Sigma(B)$, $T\Sigma(G)$ every color.

For example, when a G pixel of a B line in the Bayer arrangement (hereinafter referred to as "Gb") is a pixel to be processed as shown in FIG. 3A, the analyzing section 22 calculates each additional value $T\Sigma(R)$, $T\Sigma(B)$, $T\Sigma(G)$ every color according to the following equations (here, a pixel signal at a vertical position y and a horizontal position x is represented by Cyx. For example, C23 corresponds to a pixel signal at the center of the local area).

$T\Sigma(R) = (C11+C13+C15+C31+C33+C35)$ $T\Sigma(B) = (C00+C02+C04+C06+C20+C22+C24+C26+C40+C42+C44+C46)$ $T\Sigma(G) = (C01+C03+C05+C10+C12+C14+C16+C21+C23+C25+C30+C32+C34+C36+C41+C43+C45)$ For example when a G pixel of an R line of the Bayer arrangement (hereinafter referred to as "Gr") is a pixel to be processed as shown in FIG. 3B, the analyzing section 22 calculates each additional value $T\Sigma(R)$, $T\Sigma(B)$, $T\Sigma(G)$ every color according to the following equations:

$T\Sigma(R) = (C00+C02+C04+C06+C20+C22+C24+C26+C40+C42+C44+C46)$ $T\Sigma(B) = (C11+C13+C15+C31+C33+C35)$ $T\Sigma(G) = (C01+C03+C05+C10+C12+C14+C16+C21+C23+C25+C30+C32+C34+C36+C41+C43+C45)$ For example when a B pixel of the Bayer arrangement is a pixel to be processed as shown in FIG. 3C, the analyzing section 22 calculates each additional value $T\Sigma(R)$, $T\Sigma(B)$, $T\Sigma(G)$ every color according to the following equations.

$T\Sigma(R) = (C10+C12+C14+C16+C30+C32+C34+C36)$ $T\Sigma(B) = (C01+C03+C05+C21+C23+C25+C41+C43+C45)$ $T\Sigma(G) = (C00+C02+C04+C06+C11+C13+C15+C20+C22+C24+C26+C31+C33+C35+C40+C42+C44+C46)$ For example, when an R pixel of the Bayer arrangement is a pixel to be processed as shown in FIG. 3D, the analyzing section 22 calculates each additional value $T\Sigma(R)$, $T\Sigma(B)$, $T\Sigma(G)$ every color according to the following equations.

$T\Sigma(R) = (C01+C03+C05+C21+C23+C25+C41+C43+C45)$ $T\Sigma(B) = (C10+C12+C14+C16+C30+C32+C34+C36)$ $T\Sigma(G) = (C00+C02+C04+C06+C11+C13+C15+C20+C22+C24+C26+C31+C33+C35+C40+C42+C44+C46)$ Here, the analyzing section 22 divides the sum of the additional values $T\Sigma(R)$, $T\Sigma(B)$, $T\Sigma(G)$ of the respective colors by the number of pixels to thereby calculate the averaged luminance information. In this case, the sum of the additional values may be carried out while conducting the additional values on weighted averaging by using a ratio of visual sensitivity of respective colors (for example, R:G:B=3:6:1) as a weight, thereby calculating averaged luminance information in consideration of the visual sensitivity.

Step S3: Subsequently, the analyzing section 22 calculates an average chromaticity coordinate of the local area as averaged color information according to the following equation:

$(R/G, B/G) = (T\Sigma(R)/T\Sigma(G), T\Sigma(B)/T\Sigma(G))$

The additional value $T\Sigma(R)$, $T\Sigma(B)$, $T\Sigma(G)$ of each color is preferably normalized in accordance with the number of additional pixels.

Figure 4:
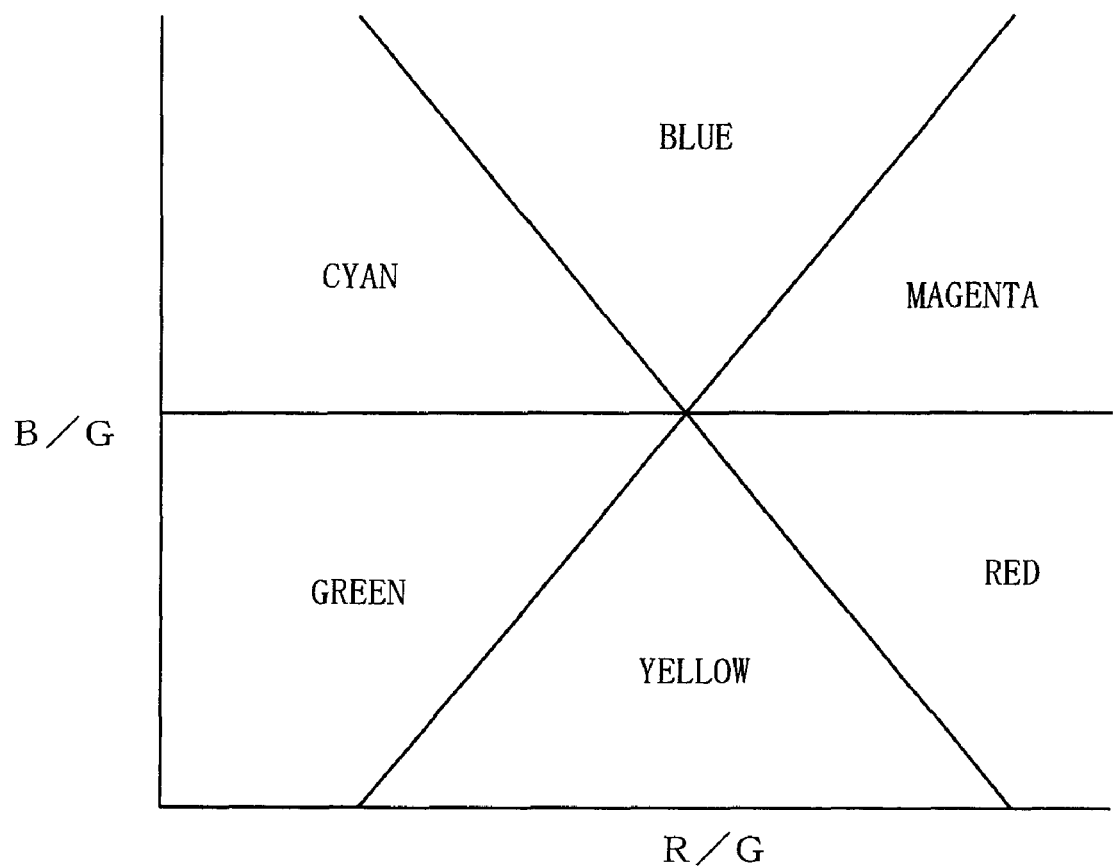
FIG. 4 is a diagram showing an example of the chromaticity coordinate.

The hue (see FIG. 4) and saturation of the local area can be identified from the chromaticity coordinate (R/G, B/G) thus calculated.

Step S4: The analyzing section 22 determines the flatness of the local area according to the following procedure.

Here, in order to simplify the description, a case where the Gb pixel is located at the center of the local area (see FIG. 3A) will be described. In other cases, if the same calculation is carried out in consideration of a color arrangement of the local area, the flatness could be calculated.

(1) Differences UD (R), UD(B), UD(G) in the vertical direction $$UD(R) = |(C11 + C13 + C15) - (C31 + C33 + C35)|$$

$$UD(B) = \left| \begin{array}{c} (C00 + C02 + C04 + C06) - \\ (C40 + C42 + C44 + C46) \end{array} \right|$$

$$UD(G) = \left| \begin{array}{c} (C01 + C03 + C05 + C10 + C12 + C14 + C16) - \\ (C30 + C32 + C34 + C36 + C41 + C43 + C45) \end{array} \right|$$

(2) Differences LR(R), LR(B), LR(G) in the horizontal direction $$LR(R) = |(C11 + C31) - (C15 + C35)|$$

$$LR(B) = \left| \begin{array}{c} (C00 + C02 + C20 + C22 + C40 + C42) - \\ (C04 + C06 + C24 + C26 + C44 + C46) \end{array} \right|$$

$$LR(G) = \left| \begin{array}{c} (C01 + C10 + C12 + C21 + C30 + C32 + C41) - \\ (C05 + C14 + C16 + C25 + C34 + C36 + C45) \end{array} \right|$$

(3) Differences AN1(R), AN1(B) AN1(G) in obliquely lower right direction $$AN1(R)=|(C11+C13+C31)-(C15+C33+C35)|$$

$$AN1(B)=|(C00+C02+C04+C20+C22+C40)-(C06+C24+C26+C42+C44+C46)|$$

$$AN1(G)=|(C01+C03+C10+C12+C21+C30)-(C16+C25+C34+C36+C43+C45)|$$

(4) Differences AN2(R), AN1(B), AN2(G) in obliquely upper right direction $$AN2(R)=|(C13+C15+C35)-(C11+C31+C33)|$$

$$AN2(B)=|(C02+C04+C06+C24+C26+C46)-(C00+C20+C22+C40+C42+C44)|$$

$$AN2(G)=|(C03+C05+C14+C16+C25+C36)-(C10+C21+C30+C32+C41+C43)|$$

(5) Calculate maximum differences STEP(R), STEP(B), STEP(G) every color $$STEP(R)=MAX(UD(R),LR(R),AN1(R),AN2(R))$$

$$STEP(B)=MAX(UD(B),LR(B),AN1(B),AN2(B))$$

$$STEP(G)=MAX(UD(G),LR(G),AN1(G),AN2(G))$$

(6) An average value of the maximum differences STEP (R), STEP(B), STEP(G) of the respective colors is calculated. In this case, an average value may be calculated in consideration of visual sensitivity by conducting the weighted averaging with the ratio of the visual sensitivity of the respective colors (for example, R:G:B=3:6:1) as a weight.

As the average value of the maximum differences thus calculated is larger, the flatness of the local area can be estimated to be lower. Conversely, as the average value of the maximum differences is lower, the flatness of the local area can be estimated to be higher.

Step S5: The coefficient determining section 23 achieves the averaged luminance information, the averaged color information and the flatness from the analyzing section 22.

The coefficient determining section 23 collates these information with the following conditions stored in the correspondence setting section 24 to judge whether the pixel to be processed is a place at which color aberration in magnification occurs.

(1) The averaged color information is in a hue range of any one of green and magenta.

(2) The flatness is lower than a predetermined threshold value, and thus it indicates a color boundary or edge portion. Here, the threshold value is preferably set to flatness at which conspicuousness of color aberration in magnification begins.

If both the conditions (1) and (2) are satisfied, the coefficient determining section 23 judges that the pixel to be processed is a place at which the color aberration in magnification occurs, and shifts the processing to Step S6.

In the other cases, the coefficient determining section 23 shifts the processing to Step S7. By adding the following conditions (3) and (4) to the above judgment, it may be more surely judged whether the pixel to be processed is a place at which color aberration in magnification occurs.

(3) The pixel to be processed is at a peripheral portion of the screen.

(4) An occurrence probability of color aberration in magnification is high from information of a photographing optical system (focus distance, aberration information, etc.).

Step S6: In this step, the probability that the pixel to be processed is an occurrence place of color aberration in magnification is high. Therefore, the coefficient determining section 23 adjusts the correcting coefficient group so that the saturation (particularly, green saturation and magenta saturation) is decreased. Through this adjustment, the color converting section 19 converts the pixel corresponding to the occurrence place of the color aberration in magnification to a pixel having lower saturation, thereby achieving excellent image data which are inconspicuous in color aberration in magnification.

Step S7: The coefficient determining section 23 collates the following conditions stored in the correspondence setting section 24, and judges whether the pixel to be processed is a place of skin tone or not.

(1) The averaged color information is in a predetermined hue range of skin tone.

(2) The averaged luminance information is in a luminance range of skin tone.

(3) The flatness is higher than a predetermined threshold value, and it is in a flatness range of skin.

Here, it is preferable that image data of skin are collected from various photographing results and the above threshold value is determined from the image data thus collected.

If all of the conditions (1) to (3) are satisfied, the coefficient determining section 23 judges that the processing target is a place of skin tone, and shifts the processing to Step S8.

In the other cases, the coefficient determining section 23 shifts the processing to Step S9.

Step S8: In this step, the probability that the pixel to be processed is a skin portion is high. Therefore, the coefficient determining section 23 selectively increases the saturation of the hue range of skin or varies the hue of the skin tone to a hue reflecting a complexion (i.e., color is varied to be nearer to pink, nearer to red, liver, burned umber) to thereby enhancing reproducibility of skin tone.

Through this adjustment, excellent image data can be achieved as a result of the color conversion like the complexion of a person is better.

Step S9: The coefficient determining section 23 collates the following conditions stored in the correspondence setting section 24 to judge whether the pixel to be processed is a place of blue sky.

(1) The averaged color information is in a predetermined hue range of blue sky.

(2) The averaged luminance information shows a brighter value than luminance indicated by a predetermined threshold value, and is in a luminance range of blue sky.

(3) The flatness is flatter than flatness indicated by a predetermined threshold value, and is in a flatness range of blue sky.

Here, it is preferable that image data of blue sky are collected from various photographing results and the threshold value concerned is determined from the image data thus collected.

If all of the conditions (1) to (3) are satisfied, the coefficient determining section 23 judges that the processing target is a place of blue sky, and shifts the processing to Step S10.

In the other cases, the coefficient determining section 23 shifts the processing to Step S11.

Step S10: In this step, the probability that the pixel to be processed corresponds to blue sky is high. Therefore, the coefficient determining section 23 selectively increases the saturation of the hue range of blue sky or varies the hue of blue sky so that the color is nearer to a vividly dark-blue color, thereby enhancing reproducibility of blue sky.

Through this adjustment, excellent image data can be achieved as a result of the color conversion like blue sky becomes vivid.

Step S11: The coefficient determining section 23 collates the correspondence relation stored in the correspondence setting section 24 to adjust the correcting coefficient group so that the saturation of an average hue of the local area which is indicated by the averaged color information is selectively enhanced. If the saturation of the averaged color information is lower than a predetermined threshold value, it is preferable that the color of the area is judged to be nearer to achromatic color, and the adjustment of Step S11 is bypassed.

Through this adjustment, as the local area indicates a more uniform hue, the hue is converted to a more vivid hue.

Even when a one-shot type color noise is contained in a processing target, the probability that the color noise is subjected to saturation emphasis is lower as the color noise is more different from an average hue of a local area containing the color noise and thus more conspicuous. Therefore, there can be remarkably overcome the trouble of the related art that color noise is more conspicuous through the adjustment of the pixel-based color conversion characteristic.

Step S12: The coefficient determining section 23 collates the correspondence relation stored in the correspondence setting section 24 to judge whether the averaged luminance information is in a range of intermediate gradation.

The intermediate gradation range is preferably set to a gradation area in which the trouble of the saturation emphasis is low.

If the averaged luminance information is in the intermediate gradation range, the coefficient determining section 23 shifts the processing to Step S13.

On the other hand, in the other cases, the coefficient determining section 23 shifts the processing to Step S14.

Figure 5:
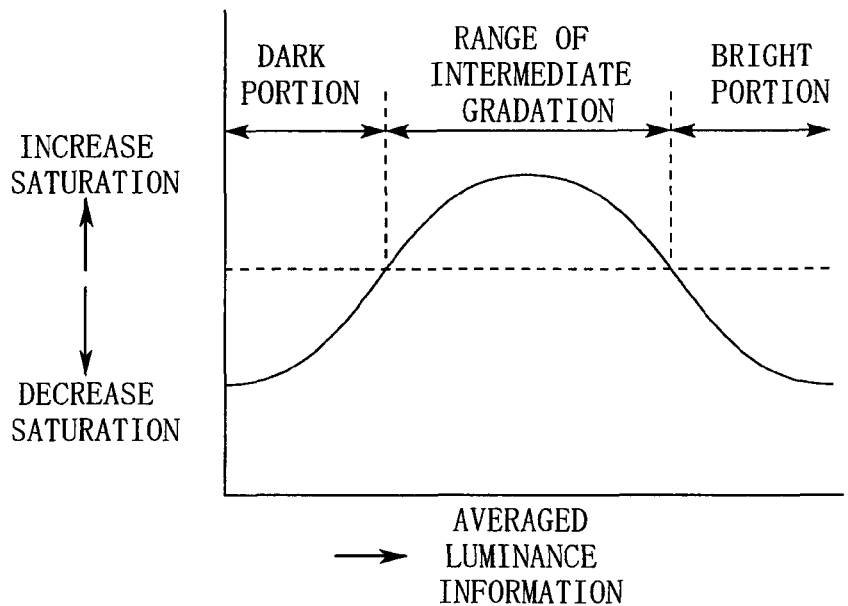
FIG. 5 is a diagram showing an example of an adjustment tendency.

Step S13: IF the averaged luminance information is in the intermediate gradation range, the coefficient determining section 23 adjusts the correcting coefficient group so that the saturation is enhanced. FIG. 5 shows an example of such an adjustment tendency.

Through this adjustment, color variation is emphasized in an intermediate gradation area, and excellent image data are achieved as a result of the color conversion.

After the adjustment, the coefficient determining section 23 shifts the processing to Step S15.

Step S14: If the averaged luminance information is out of the intermediate gradation range, the coefficient determining section 23 adjusts the correcting coefficient group so that the saturation is decreased. FIG. 5 shows an example of such an adjustment tendency.

Even when a pixel to be processed gets into the intermediate gradation range due to noise, the color conversion is carried out so as to decrease the saturation if the local area is a bright portion or dark portion as a whole.

As a result, such a trouble that color noise is conspicuous at a dark portion or color saturation occurs at a bright portion can be surely suppressed.

Step S15: The coefficient determining section 23 collates the correspondence relation of the correspondence setting section 24 on the basis of the flatness to adjust the correcting coefficient group.

In this case, as the flatness is higher, the correcting coefficient group is adjusted so that the saturation is increased. Conversely, as the flatness is lower, the correcting coefficient group is adjusted so that the saturation is decreased.

Figure 6:
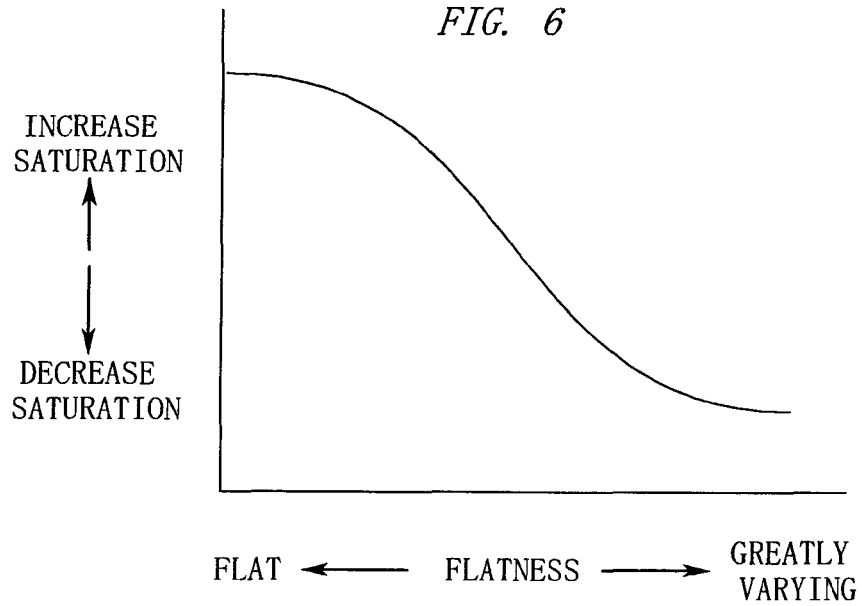
FIG. 6 is a diagram showing an example of an adjustment tendency.

FIG. 6 is a diagram showing an example of such an adjustment tendency as described above.

Through this adjustment, the saturation is decreased at an edge portion or color boundary, so that occurrence of false color can be surely prevented. Conversely, the saturation is increased at a flat area, so that an impression of an overall image can be made vivid in color.

Supplemental Matters of Embodiment

In the above-described embodiment, the signal processing device (the analyzing section 22, the coefficient determining section 23, the correspondence setting section 24 and the color converting section 19) is mounted in the electronic camera. However, the present invention is not limited to this mode. For example, the signal processing device may be mounted in other color image equipment.

Furthermore, a signal processing program may be created to make a computer function as the color converting section 19, the coefficient correcting section (the analyzing section 22, the coefficient determining section 23, the correspondence setting section 24, etc.). By using this signal processing program, proper color conversion processing can be conducted on image data (particularly, RAW data) on the computer.

Furthermore, in the above-described embodiment, any correspondence relation may be used as the correspondence relation preset in the correspondence setting section 24 insofar as the "correcting coefficient group" can be determined by collating the feature information (for example, the averaged luminance information, the averaged color information, the flatness) of a local area. For example, there may be used a loop-up table in which feature information of a local area and a selection number of a correcting coefficient group are stored in correspondence with each other as the correspondence relation. Still furthermore, there may be used an arithmetic expression for calculating a correction amount for a correcting coefficient group from feature information as the correspondence relation.

The invention is not limited to the above embodiments and various modifications may be made without departing from the spirit and scope of the invention. Any improvement may be made in part or all of the components.

What is claimed is:
1. A signal processing device, comprising:
a color converting section multiplying an input color pixel signal by a transformation matrix to execute color conversion processing; and a coefficient correcting section setting a correcting coefficient group to a coefficient group of the transformation matrix, wherein the coefficient correcting section includes an analyzing section setting a local area containing a pixel to be processed and calculating averaged color information and flatness on the basis of plural pixel signals of the local area, an aberration judging section judging whether a condition (1) the averaged color information is in a hue range of any one of green and magenta, and a condition (2) the flatness is lower than a predetermined threshold value and indicates a color boundary or edge portion are satisfied, and a coefficient determining section setting a correcting coefficient group for decreasing saturation to the coefficient group to be used for the pixel to be processed when the conditions (1) and (2) are satisfied in the aberration judging section.

2. A non-transitory computer readable medium, on which is stored a signal processing program, the program, when executed by a computer, comprising:

a color converting section multiplying an input color pixel signal by a transformation matrix to execute color conversion processing; and a coefficient correcting section setting a correcting coefficient group to a coefficient group of the transformation matrix, wherein the coefficient correcting section includes an analyzing section setting a local area containing a pixel to be processed and calculating averaged color information and flatness on the basis of plural pixel signals of the local area, an aberration judging section judging whether a condition (1) the averaged color information is in a hue range of any one of green and magenta, and a condition (2) the flatness is lower than a predetermined threshold value and indicates a color boundary or edge portion are satisfied, and a coefficient determining section setting a correcting coefficient group for decreasing saturation to the coefficient group to be used for the pixel to be processed when the conditions (1) and (2) are satisfied in the aberration judging section.

3. A signal processing method comprising:

multiplying an input color pixel signal by a transformation matrix to execute color conversion processing using a color converting section; and setting a correcting coefficient group to a coefficient group of the transformation matrix using a coefficient correcting section; wherein the coefficient correcting section includes:

setting a local area containing a pixel to be processed and calculating averaged color information and flatness on the basis of plural pixel signals of the local area using an analyzing section, judging whether a condition (1) the averaged color information is in a hue range of any one of green and magenta, and a condition (2) the flatness is lower than a predetermined threshold value and indicates a color boundary or edge portion are satisfied using an aberration judging section, and setting a correcting coefficient group for decreasing saturation to the coefficient group to be used for the pixel to be processed when the conditions (1) and (2) are satisfied in the aberration judging section using a coefficient determining section.

\* \* \* \* \*